United States Patent [19]

Iwata et al.

[11] 4,017,872
[45] Apr. 12, 1977

[54] SHUTTER FOR CAMERA

[75] Inventors: Hiroshi Iwata, Osaka; Katsuji Ishikawa, Daito, both of Japan

[73] Assignee: West Electric Company, Ltd., Osaka, Japan

[22] Filed: Feb. 18, 1975

[21] Appl. No.: 550,367

[30] Foreign Application Priority Data

Feb. 22, 1974 Japan .............................. 49-21153

[52] U.S. Cl. .............................. 354/29; 354/23 D; 354/31
[51] Int. Cl.² .............................. 354/60 A; 354/234; G03B 7/14; G03B 7/08
[58] Field of Search ................. 354/23 D, 26, 60 A, 354/234, 44, 31, 29

[56] References Cited

UNITED STATES PATENTS

| 3,709,137 | 1/1973 | Starp | 354/60 A |
|---|---|---|---|
| 3,813,680 | 5/1974 | Wagensonner | 354/23 D |
| 3,833,913 | 9/1974 | Wick et al. | 354/60 A |
| 3,842,587 | 10/1974 | Strauss et al. | 354/23 D |
| 3,882,522 | 5/1975 | Erlichmann | 354/44 |
| 3,900,855 | 8/1975 | Stempeck | 354/44 |
| 3,903,528 | 9/1975 | Kee | 354/234 |

*Primary Examiner*—Russell E. Adams, Jr.
*Attorney, Agent, or Firm*—Burgess Ryan and Wayne

[57] ABSTRACT

The invention discloses a shutter for a camera of the type comprising a light control mechanism which comprises a plurality of shutter blades, which may also function as the aperture control diaphragm, and driving means such as a stepping motor for intermittently driving the shutter blades to open and close them in response to shutter driving pulse signals; a circuit for generating the shutter blade driving pulse signals with a frequency or pulse spacing determined in response to the brightness of a subject; a circuit for reversing the direction of drive of the driving means a predetermined time, which is dependent upon the brightness of the subject, after the shutter blades are started to open; a circuit for controlling the frequency or pulse spacing of the driving pulse signals; and a driving circuit for controlling the driving means in response to the outputs of the pulse generating circuit and of the driving direction reversing circuit.

4 Claims, 17 Drawing Figures

SHUTTER FOR CAMERA

BACKGROUND OF THE INVENTION

The present invention relates to shutters for cameras in which a light control mechanism comprising a plurality of shutter blades, which may also function as the aperture control diaphragm, and means for intermittently opening and closing the shutter blades in response to the driving pulse signals, is controlled in response to the brightness of a subject so that the optimum exposure may be attained.

Various shutters for cameras of the type for automatically attaining the optimum exposure in response to the brightness of a subject have been devised and demonstrated. For instance, Japanese Patent Publication No. 1871/1971 has disclosed a shutter of the type in which a plurality of shutter blades, which may also function as the aperture control diaphragm, are wide opened within the order of tens of micro-seconds with the aid of a delayed action governer, and then closed after the exposure in response to the brightness of a subject has been attained. There has been also devised and demonstrated a shutter in which a desired aperture stop is set by an aperture stop control mechanism actuated by driving means with a movable coil, and then a shutter mechanism is opened for a predetermined time.

In the former type, the governor mechanism is very complex in construction, consisting of many parts which must be fabricated with severe manufacturing tolerances so that exposure characteristics tend to change when the shutter has been used for a long time.

In the latter type, the driving means with a movable coil is used so that the response to the quick change in brightness of a subject is not satisfactory. For instance, when the brightness of a subject suddenly becomes high or low immediately before the aperture stop is to be set, the aperture setting mechanism cannot respond to the change in brightness of the subject satisfactorily, resulting in an erratic exposure. Moreover, the latter type has another inherent limitation in that the driving means with a movable coil is damaged even by very weak mechanical shock. A further inherent limitation is that the mechanism is complex because both the shutter mechanism and the aperture setting mechanism must be provided. To actuate the shutter mechanism, the mechanical spring force must be charged and stored, and the spring force must be charged and stored everytime the shutter operation has been accomplished, so that the shutter cannot be opened a plurality of times in succession within a relatively very short time. When it is desired to remotely control a camera by using an electromagnetic wave control signal, a solenoid, which is energized by a battery in response to the output signal from a receiver, must be attached on the camera so that the shutter button may be depressed upon reception of the control signal. Therefore, the remotely-controlled camera equipment is very large in size.

SUMMARY OF THE INVENTION

In view of the above, one of the objects of the present invention is to provide an improved shutter for a camera which may substantially eliminate the above difficulties encountered in conventional shutters.

Another object of the present invention is to provide a shutter for a camera which may sufficiently withstand mechanical shocks or impacts and can exhibit stable exposure characteristics even after use for a long time.

A further object of the present invention is to provide a shutter for a camera capable of immediately responding to the sudden change in brightness of a subject so that the optimum exposure may be always attained.

A further object of the present invention is to provide a shutter for a camera which may eliminate the step of charging a spring or the like in case of film advancing for storing the force required for actuating the shutter.

A further object of the present invention is to provide a shutter for a camera which may be remote-controlled in a simple manner.

A further object of the present invention is to provide a shutter for a camera wherein a plurality of shutter blades, which may also function as the aperture control diaphragm, are opened stepwise while the brightness of a subject is detected, and then closed at a speed faster than when they are opened, after the optimum exposure has been attained.

Briefly stated, in accordance with the present invention, a shutter for a camera comprises a light control mechanism comprising a plurality of shutter blades which may also function as an aperture control diaphragm, and means for driving stepwise the shutter blades in response to shutter driving pulse signals; a circuit for generating driving pulse signals with a frequency or pulse spacing determined in response to the brightness of a subject; a driving direction indicating circuit for reversing the direction of driving of the driving means a predetermined time depending upon the brightness of the subject after the shutter blades are opened; a circuit for controlling the frequency or pulse interval of the driving pulse signals from the pulse generating circuit; and a driving circuit for controlling the shutter blade driving means in response to the outputs from the pulse signal generating circuit and the driving direction indicating circuit.

In one preferred embodiment of the present invention, a stepping motor which rotates stepwise in response to the pulse signals is used as the shutter blade driving means. The area of the opening defined by the shutter blades may be determined by the number of discrete rotations through a relatively very small angle of the stepping motor, that is, the number of driving pulses applied to the stepping motor while the latter is rotated in the direction in which the shutter blades are opened.

The driving direction indicating circuit causes the stepping motor to rotate in the direction in which the shutter blades are opened when the first driving pulse signal is applied thereto, but after a predetermined time depending upon the brightness of a subject, it gives the reversing signal to the stepping motor to rotate it in the reverse direction. Therefore, when the brightness of a subject is high, the shutter is closed a short time after it is opened, but when the brightness is low, the shutter is closed a relatively long time after is opened. The frequency or pulse interval of the driving pulse signals may be constant or may be varied depending upon the brightness of a subject, and the area of the opening defined by the shutter blades may be dependent upon a time when the stepping motor is reversed in direction, so that the optimum exposure may be ensured depending upon the brightness of the subject.

DESCRIPTION OF THE PREFERRED EMBODIMENT

Driving Means

Figure 1A:
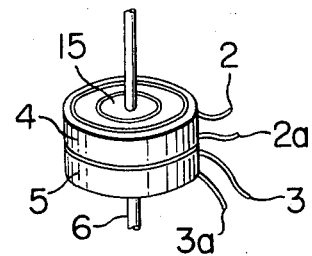
FIG. 1A is a perspective view of a stepping motor used in the present invention as means for driving a plurality of shutter blades which may also function as an aperture control diaphragm.
Figure 1B:
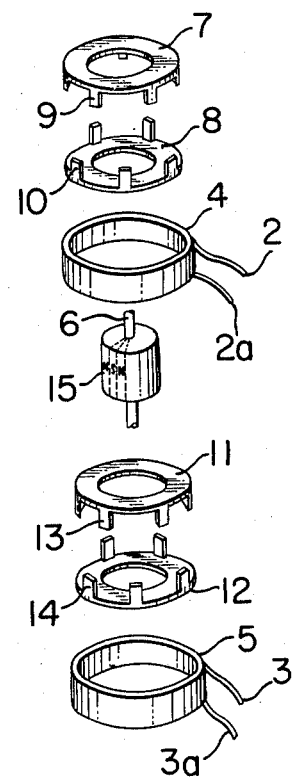
FIG. 1B is an exploded perspective view thereof.

FIG. 1A is a perspective view of a stepping motor used as shutter blade driving means in a shutter for camera in accordance with the present invention. The stepping motor 1 generally comprises a rotor 15 with a shaft 6 and field or driving coils 4 and 5 with leads wires 2 and 2a, and 3 and 3a, respectively, which surround the rotor 15. As shown in FIG. 1B, two magnet rings 7 and 8 are assembled in such a way that they are vertically spaced apart from each other by their upwardly and downwardly directed projections 9 and 10 and that these projections 9 and 10 are equiangularly spaced apart from each other. The magnet ring assembly thus assembled is fitted into the field coil 4. In like manner, a lower magnet ring assembly consisting of two magnet rings 11 and 12 assembled in a manner substantially similar to that described above, is fitted into the lower field coil 5. Thereafter, the upper and lower field coils 4 and 5 are assembled as shown in FIG. 1A.

The rotor 15, which is fitted into the field coil assembly, has at its side surface permanent magnetic poles N and S disposed equiangularly and alternately, the number of these poles N and S being one half of the total number of the projections 9, 10, 13 and 14 of the magnetic rings 7, 8, 11 and 12.

Figure 2A:
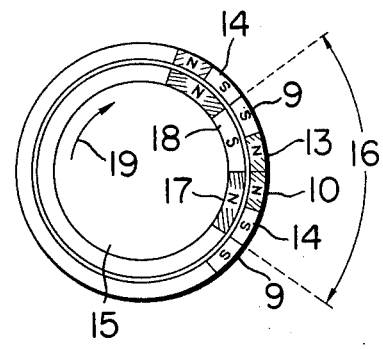
FIGS. 2A. 2B and 2C are diagrams used for the explanation of the mode of operation of the stepping motor.
Figure 2B:
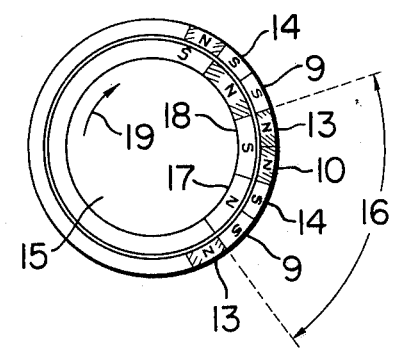
Figure 2C:
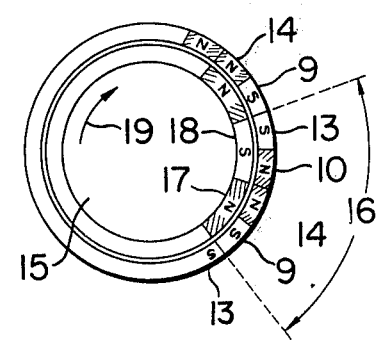

Next referring to FIGS. 2A, 2B and 2C, the mode of operation of the stepping motor 1 with the above construction will be described. The field coils 4 and 5, which are connected through their lead wires 2, 2a, 3 and 3a to a power supply (not shown), are so energized that the projections 9, 10, 13 and 14 of the magnetic rings 7, 8, 11 and 12 have the magnetic polarities as shown in FIG. 2A. Then, the N-pole 17 of the rotor 15 in a section indicated by broken lines 16 is repelled from the projection or N-pole 10, but is attracted toward the projection 14. In like manner, the S-pole 18 of the rotor 15 is repelled from the projections or S-pole 9, but is attracted toward the projection or N-pole 13. As a result, the rotor 15 is rotated in the clockwise direction as indicated by the arrow 19, and is stopped at the position shown in FIG. 2B where the magnetic balance between the rotor 15 and the field coils 4 and 5 is reached.

Next the field coil 5 is energized in the reverse direction so that the polarities of the projection 13 of the magnetic ring 11 and the projection 14 of the magnetic ring 12 are reversed. As a result, the rotor 15 is rotated further in the clockwise direction and is stopped at the position at which the magnetic balance between the rotor 15 and the field coils 4 and 5 is attained. Thus, by reversing the direction of the current flowing through the field coils 4 and 5, the rotor 15 may be rotated stepwise through a discrete angle.

As shown in FIG. 3, a light control mechanism of the shutter for a camera in accordance with the present invention comprises, in general, a pair of shutter blades 20 and 21 having one end pivoted with a common pivot pin 22 to a camera body. The other end of each shutter blade 20 or 21 terminates into a semicircular end portion provided with an arcuate slot 25 or 26 into which is slidably fitted a driving pin 23 or 24 extending from the stepping motor 1. The shutter blades 20 and 21 are provided with V-shaped cutout portions 28 and 29 which cooperates with each other so as to define an opening 27 as will be described in detail hereinafter.

Figure 3A:
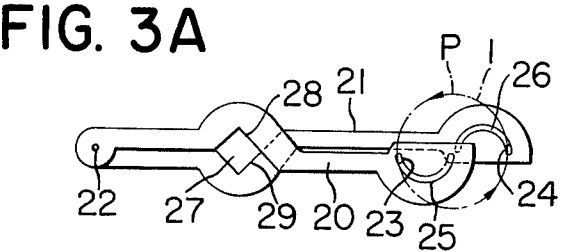
FIGS. 3A and 3B are top views of a first embodiment of a light control mechanism in accordance with the present invention comprising a pair of shutter blades and the stepping motor shown in FIG. 1.
Figure 3B:
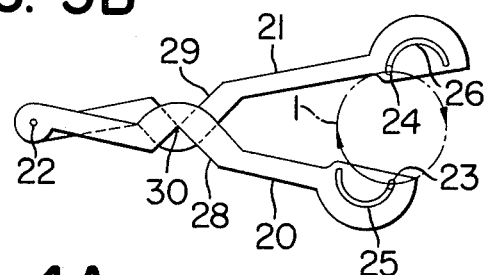

When the stepping motor 1 is rotated intermittently in the direction indicated by the arrow P, the driving pins 23 and 24 thereof are also displaced intermittently within the arcuate slots 25 and 26, respectively, so that the opening 27, which is shown as being wide open in FIG. 3A, is closed as indicated at 30 in FIG. 3B. To form the opening, the stepping motor 1 is reversed in the direction indicated by the arrow I, and the degree of the opening 27 may be suitably determined by changing the curvature of the arcuate slots 25 and 26.

Figure 4A:
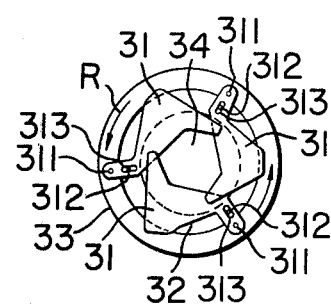
FIGS. 4A, 4B and 4C are a top view, an exploded view, and a perspective view, respectively of a second embodiment of a light control mechanism in accordance with the present invention comprising three shutter blades.
Figure 4B:
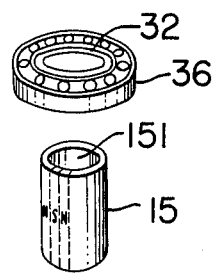
Figure 4C:
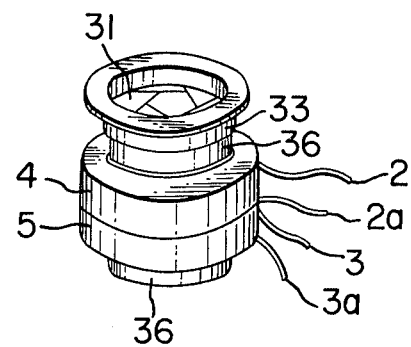

FIGS. 4A–4C show the second embodiment of a light control mechanism in accordance with the present invention comprising, in general, three shutter blades 31 and a stepping motor. As shown in FIG. 4A, each shutter blade 31 has one end pivoted at 312 to a stationary ring 33 in such a way that when a rotary ring 32 is rotated in the direction indicated by the arrow R the opening 34 defined by the three shutter blades 31 may be reduced in area. The stepping motor used in the second embodiment is substantially similar in construction to the stepping motor 1 described hereinbefore except that a hollow rotor 35 is used. Both ends of the rotor 15 are journalled by antifriction bearings 36, and the rotary ring 33 is attached to the upper bearing 36 as shown in FIG. 4C.

Referring back to FIG. 4A, each shutter blade 31 is pivoted with a pivot pin 311 to the rotary ring, and has an elongated slot 313 into which is fitted a pin (not shown) extending from the rotary ring 32.

According to the second embodiment, the opening 34 is defined by the shutter blades 31 in coaxial relation with the rotor 35 of the stepping motor 1, so that there is an advantage that the light control mechanism may be made compact in size.

First Embodiment of Control Circuit

Figure 5:
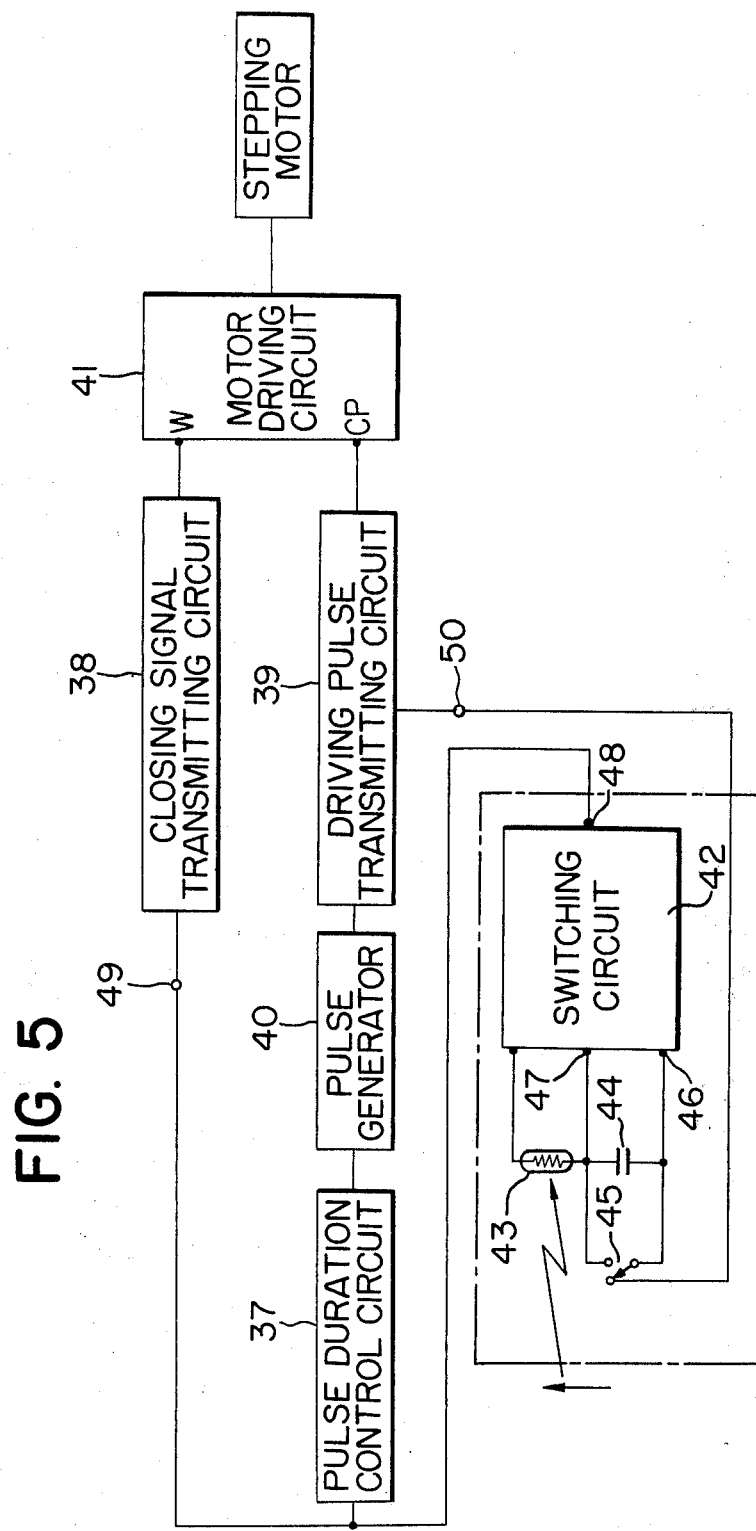
FIG. 5 is a block diagram of a first embodiment of a control circuit for controlling the light control mechanism shown in FIGS. 3A and 3B or in FIGS. 4A, 4B and 4C.
Figure 6:
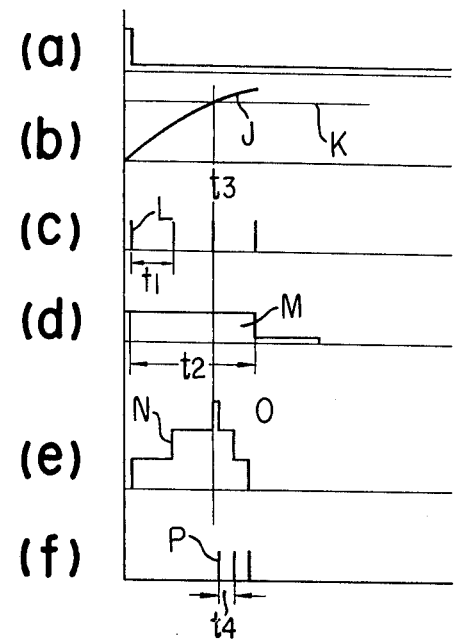
FIG. 6 shows the waveforms used for the explanation of the mode of operation thereof.
Figure 7:
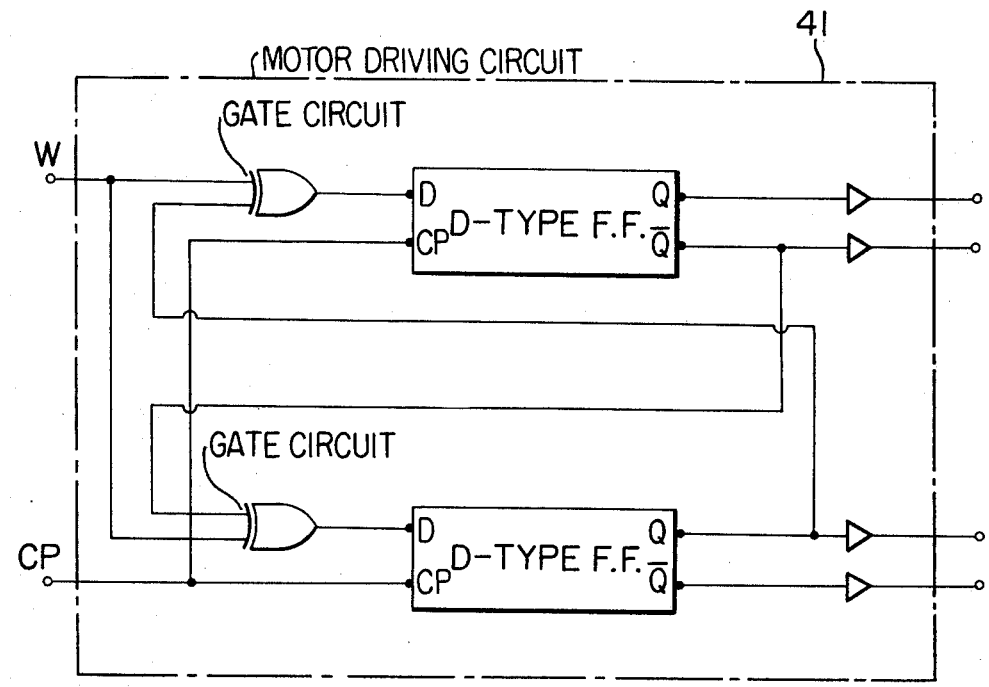
FIG. 7 is a detailed diagram of a stepping motor driving circuit in the control circuit shown in FIG. 5.

FIG. 5 is a block diagram of the first embodiment of a control circuit for a shutter in accordance with the present invention. A shutter release button (not shown) is operatively coupled to the shutter mechanism, and when the shutter button is not depressed, a switch 45 is closed to shunt a capacitor 44 in an integrator. When the shutter button is depressed, the normally closed switch 45 is opened and connected to a terminal, the signal shown at a in FIG. 6 is applied to the terminal 50, and the integrating capacitor 44 is charged through a photoelectric element 43 such as a photoelectric cell or photoconductive element such as CdS whose photoelectric voltage or resistance changes depending upon the intensity of light from an object impingeing thereupon. Concurrently, a pulse generator 40 is actuated to generate a train of opening or forward driving pulse signals L indicated at (c) in FIG. 6. The pulse spacing $t_1$ of the opening or forward driving pulse signals L may be suitably controlled in response to the output from a pulse frequency control circuit 37. The shutter driving pulse signals L are transmitted through a shutter driving pulse transmitting circuit to a motor driving circuit 41 for driving the stepping motor SM. The driving pulse transmitting circuit 39 is so arranged as to be actuated when the switch 45 is closed, generating a pulse signal M with a pulse duration $t_2$ the driving pulse signals L are transmitted through the driving pulse transmitting circuit 39 and applied to an input terminal CP of the motor driving circuit 41. The motor driving circuit 41 generates driving pulse signals for driving the stepping motor by changing the direction of the current flowing through the driving coils 2, 2a, 3 and 3a. FIG. 7 shows a detailed diagram of the motor driving circuit 41 for driving the stepping motor of the type shown in FIG. 1, the driving circuit comprising a plurality of flip-flops and a plurality of gates for controlling the flip-flops. In response to the pulse signals applied to the input terminal CP, the motor driving circuit 41 causes the stepping motor to rotate stepwise while in response to the signal applied to an input terminal W, it reverses the direction of rotation of the stepping motor. Since the driving circuit 41 does not constitute the present invention and may be of any conventional type, the detailed description thereof shall not be made in this specification. In summary, in response to the opening pulse signals L to be applied to the input terminal CP, the motor driving circuit 41 drives the stepping motor 1 so that the shutter blades are opened. Unless the closing pulse signals P indicated at (f) in FIG. 6 from a closing pulse signal transmitting circuit 38 are applied to the input terminal W of the driving motor 41, the latter drives the stepping motor in the direction in which the shutter blades are opened as shown in FIG. 6(e) in steps, the number of which correspond to the number of the opening pulse signals L to be applied to the input terminal CP of the motor driving circuit 41.

At the time $t_3$ when a physical quantity generated in accordance with the brightness of the subject has reached a predetermined level, that is, when the voltage across the capacitor 44, applied to an input terminals 46 and 47 of a switching circuit 42 to generate the closing signal for reversing the operation, rises to a level K shown in FIG. 6(b), the closing signal is transmitted from the output terminal 48 of the switching circuit 42 to the input terminal 49 of the closing signal transmitting circut 38 and to the pulse frequency control circuit 37. In response to the closing signal, the closing signal transmitting circuit 38 generates the closing pulse signals, which are applied to the input terminal W of the motor driving circuit 41 so that the stepping motor SM is rotated in the reverse direction. When the brightness of a subject is high, the stepping motor SM is reversed sooner than when the brightness is low. Thus, the optimum exposure may be attained in response to the brightness of the subject.

In response to the closing signal from the switching circuit 42, the frequency control circuit 37 reduces the pulse spacing of the driving pulse signals generated by the pulse generator 40 from $t_1$ (see FIG. 6(c)) to $t_4$ (see FIG. 6(f)). The driving pulse signals P with a shorter pulse spacing $t_4$ are transmitted through the pulse transmitting circuit 39 to the input terminal CP of the motor driving circuit 41, so that the stepping motor SM is driven so that the opening defined by the shutter blades is quickly closed as indicated by 0 in FIG. 6(e) in the reversed direction.

According to the first embodiment described above, the exposure is determined almost by the opening characteristic N shown in FIG. 6(e). Moreover, the area of the opening defined by the shutter blades and the time during when the shutter blades remain open are determined independently of each other. Therefore, a so-called programmed shutter operation may be accomplished.

Second Embodiment

In the first embodiment, when the pulse spacing of the driving pulse signals is determined, the aperture stop is uniquely determined. Therefore, when the aperture stop is, for instance, f-4, the exposure value EV 12 can be obtained only with the combination of an exposure time Tr equal to 1/1250 sec. To overcome this problem, according to the second embodiment of the present invention shown in FIG. 8, a suitable exposure value EV may be obtained by various combinations of the f stop and the exposure time Tr depending upon the brightness of a subject. For instance, an exposure value EV may be obtained by the combination of f-8 and 1/60 sec. or f-5.6 and 1/250 sec. Therefore, the second embodiment of the present invention provides various exposure parameters.

Figures 8, 10:
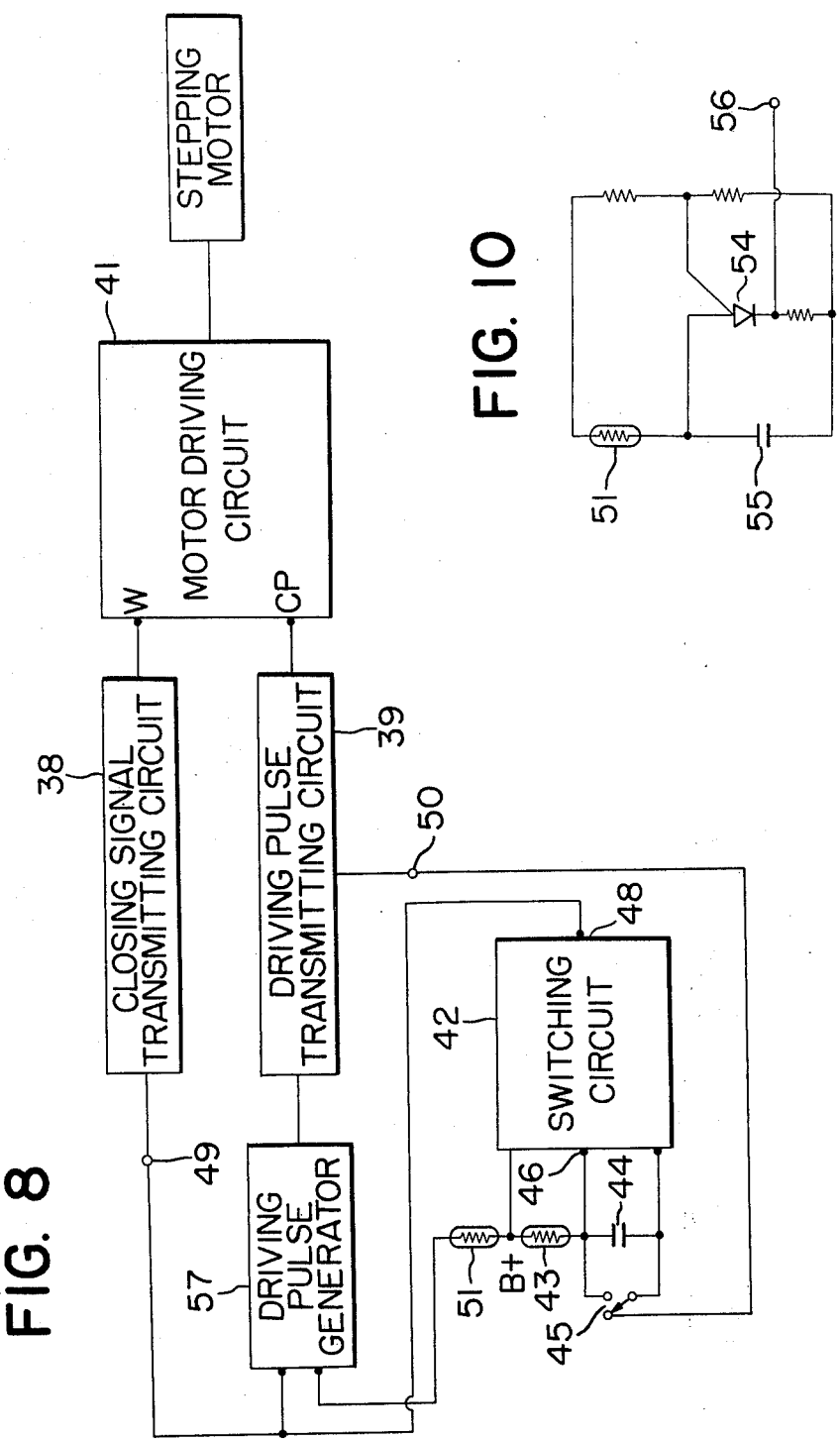
FIG. 8 is a block diagram of a second embodiment of a control circuit in accordance with the present invention.
FIG. 10 is a diagram of an oscillator circuit in the control circuit shown in FIG. 8.

Referring to FIGS. 8 and 9, the second embodiment will be described in detail hereinafter. It is substantially similar in construction to the first embodiment except that instead of the pulse frequency control circuit 37 and pulse generator 40 in the first embodiment, a shutter driving pulse generator 57 is used and that one terminal of an additional photoelectric element such as CdS 51 is connected in series with the photoelectric element 43 while the other terminal is connected to an input terminal of the driving pulse generator 57.

The driving pulse generator 57 comprises a pulse generator, a pulse spacing or frequency control circuit for changing the pulse spacing of the pulses generated by the pulse generator in response to the brightness of the subject, and a circuit for reducing the pulse spacing or frequency when the voltage across the capacitor 44 reaches a predetermined level. When the brightness of a subject is high so that the intensity of light impingeing upon the photoelectric element 51 is high, the voltage across the element 51 is at a high level as shown in FIG.

9a(i). In order to linearly change the pulse frequency of the forward driving pulse signals q indicated at (ii) in FIG. 9A and generated by the driving pulse generator 57 in response to the output voltage from the photoelectric element 51, an oscillator circuit as shown in FIG. 10 is used, comprising a transistor 54 sold under the trade name of programmed unijunction transistor, the photoelectric element 51 and a capacitor 55. The pulse signals whose frequency or pulse spacing is changed in response to the output voltage from the element 51 are derived from an output terminal 56. In response to the forward driving pulse signals q shown in FIG. 9A(ii) from the pulse generator 57, the shutter blades are opened in a manner substantially similar to that described hereinbefore as indicated at s in FIG. 9A(vi). The shutter blades are closed as indicated at T in FIG. 9A(vi) in a manner substantially similar to that of the first embodiment described elsewhere.

Figure 9A:
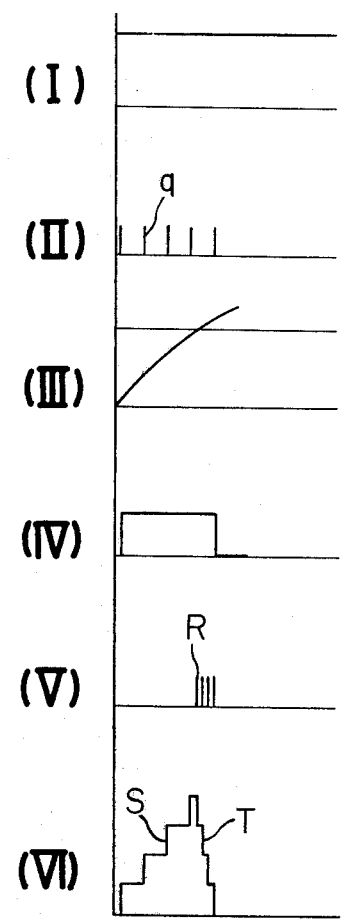
FIGS. 9A and 9B show the waveforms used for the explanation of the mode of operation of the second embodiment shown in FIG. 8.
Figure 9B:
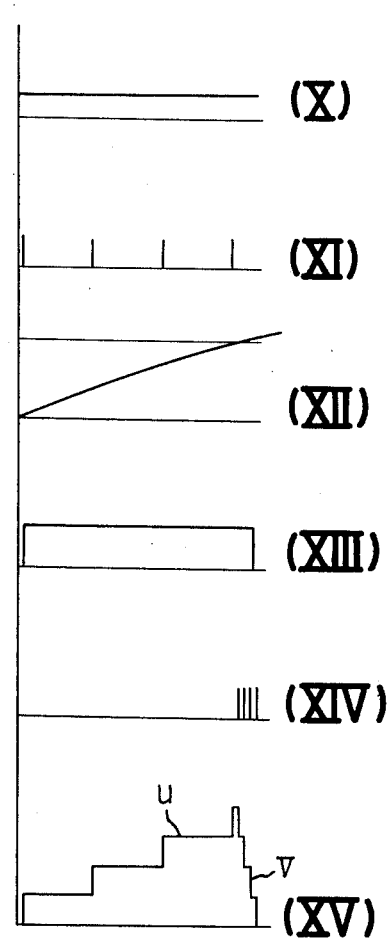

When the brightness of a subject is low, the output voltage from the photoelectric element 51 is at a low level as shown in FIG. 9B(x), so that the frequency or pulse spacing of the driving pulse signals from the pulse generator 57 becomes longer as shown in FIG. 9B(xi). Therefore, the shutter blades are opened with a wide step as indicated at u in FIG. 9B(xv) so that the exposure time becomes longer than when the brightness of a subject is high as indicated at FIG. 9A(vi).

As described hereinbefore, according to the second embodiment, the area of the opening defined by the shutter blades and the exposure time; that is, the time when the shutter blades remain open may be varied in response to the brightness of a subject, so that a suitable exposure value EV may be obtained depending upon various exposure parameters.

As described hereinbefore, according to the present invention, desired exposure characteristics may be attained by the driving mechanism, such as a stepping motor in response to a predetermined frequency or pulse spacing of the driving pulse signals, so that the mechanical governor mechanism used in the conventional shutters may be eliminated. Therefore, the variation in exposure characteristics due to the wear of the mechanical parts may be substantially prevented.

What is claimed is:
1. The shutter for cameras comprising
    a. shutter blades, shutter driving means for opening and closing said shutter blades in a succession of incremental opening motions, each of said incremental opening motions being in response to a concurrence of a shutter driving pulse and a first driving direction signal, said shutter driving means further comprising means for closing said shutter blades in a succession of incremental closing motions, each of said incremental closing motions being in response to a concurrence of a shutter driving pulse and a second driving direction signal,
    b. a first brightness detecting element connected to said switching circuit for providing a first brightness signal proportional to the integral with respect to time of said brightness,
    c. a second brightness detecting element for providing a second brightness signal,
    d. switching circuit means connected to said first brightness detecting element for providing a first switching circuit output in response to a level of said first brightness signal below a predetermined signal level and for providing a second switching circuit output in response to a level of said brightness signal above said predetermined signal level,
    e. a shutter driving pulse generator connected to said switching circuit means and to said second brightness detecting element for generating a train of pulses having a controlled pulse frequency,
    f. a pulse frequency control circuit for setting the frequency of said pulse generator to a first frequency varying as a function of the magnitude of said second brightness signal in response to said first switching circuit output and for setting the frequency of said pulse generator to a second predetermined frequency higher than said first frequency in response to said second switching circuit output,
    g. a pulse transmitting circuit means for transmitting said shutter driving pulses from said shutter driving pulse generator to said shutter driving means for a predetermined time, and
    h. a driving direction indicating circuit for generating said first and second driving direction signals in response to said first and second switching circuit outputs from said switching circuit means to said first and second switching circuit outputs from said switching circuit means

2. A shutter for cameras as set forth in claim 1 wherein said first brightness detecting element comprises
    a. a photoelectric element, and
    b. a capacitor connected in series with said photoelectric element, said brightness signal being a voltage to which said capacitor is charged by said photoelectric element.

3. A shutter for a camera as set forth in claim 1, wherein said second brightness detecting element is a photoelectric element.

4. A shutter for cameras as recited in claim 1, wherein said shutter driving means comprises a stepping motor having a rotor provided with a central opening in an optical path get together with shutter blades, whereby light passing through the shutter blades also passes through said central opening in said rotor.

* * * * *

UNITED STATES PATENT OFFICE
CERTIFICATE OF CORRECTION

Patent No. 4,017,872                     Dated     April 12, 1977

Inventor(s)  Hiroshi Iwata

It is certified that error appears in the above-identified patent and that said Letters Patent are hereby corrected as shown below:

On the cover sheet the illustrative figure should appear as shown on the attached sheet.

UNITED STATES PATENT OFFICE
CERTIFICATE OF CORRECTION

Patent No. 4,017,872   Dated April 12, 1977

Inventor(s) Hiroshi Iwata

It is certified that error appears in the above-identified patent and that said Letters Patent are hereby corrected as shown below:

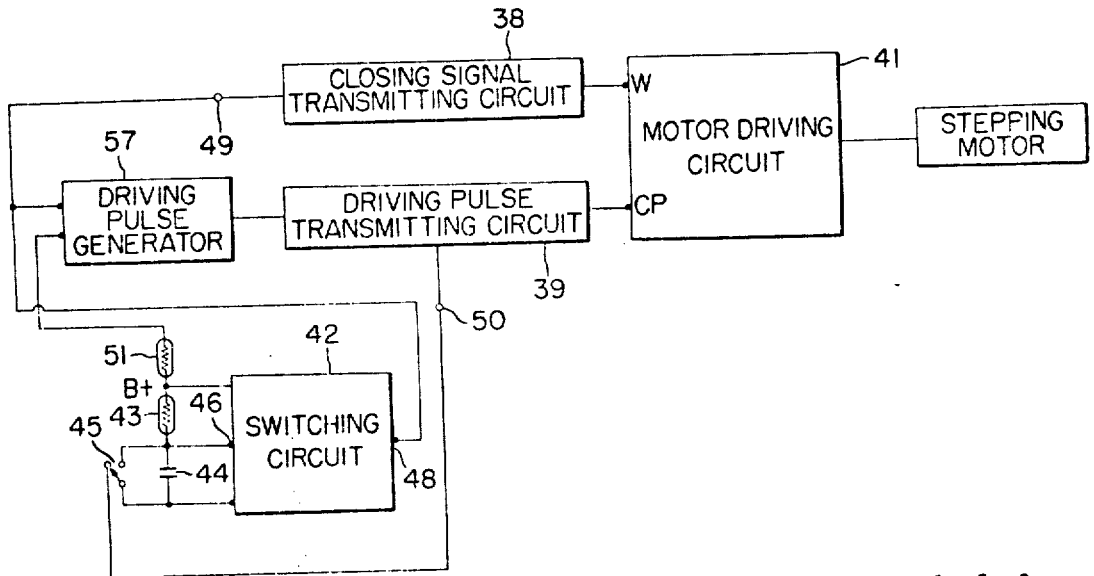

Signed and Sealed this

Twenty-ninth Day of November 1977

[SEAL]

Attest:

RUTH C. MASON
Attesting Officer

LUTRELLE F. PARKER
Acting Commissioner of Patents and Trademarks